US009090793B2

(12) United States Patent
Ratering et al.

(10) Patent No.: US 9,090,793 B2
(45) Date of Patent: Jul. 28, 2015

(54) AQUEOUS LATEX COATING COMPOSITIONS

(75) Inventors: Marc Theodorus Ratering, Liederbach am Taunus (DE); Rajeev Farwaha, Belle Mead, NJ (US); Tara Joy Hansen, Friendswood, TX (US)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 290 days.

(21) Appl. No.: 13/990,550

(22) PCT Filed: Dec. 17, 2010

(86) PCT No.: PCT/US2010/061067
§ 371 (c)(1),
(2), (4) Date: Oct. 2, 2013

(87) PCT Pub. No.: WO2012/082141
PCT Pub. Date: Jun. 21, 2012

(65) Prior Publication Data
US 2014/0018473 A1 Jan. 16, 2014

(51) Int. Cl.
| | |
|---|---|
| C09D 5/02 | (2006.01) |
| C09D 123/08 | (2006.01) |
| C09D 125/14 | (2006.01) |
| C09D 133/02 | (2006.01) |
| C09D 133/08 | (2006.01) |
| C09D 133/10 | (2006.01) |
| C09D 133/12 | (2006.01) |
| C09D 131/04 | (2006.01) |
| C09D 139/00 | (2006.01) |
| C08L 33/02 | (2006.01) |
| C08L 33/06 | (2006.01) |
| C08L 33/08 | (2006.01) |
| C08L 33/10 | (2006.01) |
| C08L 33/12 | (2006.01) |

(52) U.S. Cl.
CPC ............ *C09D 123/0853* (2013.01); *C09D 5/02* (2013.01); *C09D 125/14* (2013.01); *C09D 131/04* (2013.01); *C09D 133/02* (2013.01); *C09D 133/08* (2013.01); *C09D 133/10* (2013.01); *C09D 133/12* (2013.01); *C09D 139/00* (2013.01); *C08L 33/02* (2013.01); *C08L 33/06* (2013.01); *C08L 33/08* (2013.01); *C08L 33/10* (2013.01); *C08L 33/12* (2013.01)

(58) Field of Classification Search
None
See application file for complete search history.

(56) References Cited

U.S. PATENT DOCUMENTS

| | | |
|---|---|---|
| 3,620,796 A * | 11/1971 | Gordy .............................. 428/31 |
| T900,017 I4 * | 7/1972 | Gordy .............................. 427/154 |
| 3,714,099 A | 1/1973 | Biale |
| 3,935,151 A | 1/1976 | Nickerson et al. |
| 4,104,220 A | 8/1978 | Sims |
| 4,111,877 A | 9/1978 | Dixon et al. |
| 4,219,454 A | 8/1980 | Iacoviello et al. |
| 4,319,032 A | 3/1982 | Sandri et al. |
| 4,529,772 A | 7/1985 | Druschke et al. |
| 4,599,417 A | 7/1986 | Sekmakas et al. |
| 5,084,505 A | 1/1992 | Biale |
| 5,173,534 A | 12/1992 | Biale |
| 5,208,285 A | 5/1993 | Boyce et al. |
| 5,234,773 A | 8/1993 | Biale |
| 5,244,963 A | 9/1993 | Biale |
| 5,278,225 A * | 1/1994 | Kohlhammer et al. ....... 524/560 |
| 5,326,814 A | 7/1994 | Biale |
| 5,496,907 A | 3/1996 | Dochniak |
| 5,596,035 A | 1/1997 | Desor et al. |
| 5,747,572 A * | 5/1998 | Kashiwada et al. .......... 524/265 |
| 5,777,034 A | 7/1998 | Shah et al. |
| 6,174,960 B1 | 1/2001 | Phan et al. |
| 6,881,787 B2 | 4/2005 | Weier et al. |
| 6,992,121 B1 | 1/2006 | Peters et al. |
| 2004/0192828 A1 | 9/2004 | Mitsuhata et al. |
| 2007/0135567 A1 | 6/2007 | Ruhoff et al. |
| 2007/0196455 A1 | 8/2007 | Kamiyama et al. |

(Continued)

FOREIGN PATENT DOCUMENTS

| | | |
|---|---|---|
| EP | 566295 A2 | 5/1993 |
| EP | 1018535 A1 | 7/2000 |

(Continued)

OTHER PUBLICATIONS

International Search Report and Written Opinion issued in a corresponding PCT/US2010/061067.

*Primary Examiner* — Michael J Feely
(74) *Attorney, Agent, or Firm* — Roberts Mlotkowski Safran & Cole P.C.

(57) ABSTRACT

Disclosed are aqueous latex-based coating compositions which comprise a blend of an ethylene-vinyl acetate emulsion copolymer component and a selected type of acrylic emulsion copolymer component. The acrylic copolymer component comprises primarily acrylate ester co-monomers or acrylic ester co-monomers and vinyl aromatic, e.g., styrene, co-monomers. The blend of these two emulsion copolymer types also contains a specific type of hydrazine-based, water-soluble cross-linking agent which can eventually react with the acrylic emulsion copolymer component. The acrylic emulsion copolymer is one which contains minor amounts of both 1) carboxy functional co-monomers such as itaconic and/or (meth)acrylic acids, and 2) keto- or aldehyde-containing co-monomers such as diacetone acrylamide. Such latex-based coating compositions can be formulated in the form of water-based paint compositions. These paint products provide paint coatings that exhibit desirable dry and wet adhesion characteristics and desirable resistance to blocking.

20 Claims, No Drawings

(56) References Cited

U.S. PATENT DOCUMENTS

2007/0244238 A1  10/2007  Desor et al.
2010/0056696 A1   3/2010  Poole et al.
2013/0041085 A1*  2/2013  Bedwell .................. 524/275

FOREIGN PATENT DOCUMENTS

EP       2308934 A2  4/2011
JP      2002121224 A  4/2002

* cited by examiner

AQUEOUS LATEX COATING COMPOSITIONS

CROSS-REFERENCE TO RELATED APPLICATIONS

The present Application is a U.S. National Phase of PCT/US2010/061067 filed on Dec. 17, 2010. The disclosure of the PCT Application is hereby incorporated by reference into the present Application.

FIELD

The present invention relates to vinyl acetate-ethylene (VAE)-based, aqueous latex coating compositions which can be incorporated into latex paint products.

BACKGROUND

Latex-based paints have captured a significant portion of the indoor and outdoor paint market as a result of the many advantages that such paints have over solvent-based products. The main advantage of latex-based paints include easy clean up, low odor and fast dry.

Two main types of emulsion polymers are employed in formulating latex paints, namely (1) acrylic emulsion copolymers, comprising of alkyl esters of acrylic and methacrylic acid, or combinations of such esters with vinyl aromatic co-monomers like styrene, along with minor amounts of acrylic and methacrylic acid, and (2) vinyl acetate copolymers, comprising vinyl acetate in combination with ethylene, vinyl chloride and/or minor amounts of softer acrylic monomers. The acrylic emulsion polymers are mainly used in premium quality paints for excellent water resistance, desired levelling, film hardness and scrub resistance. The vinyl acetate polymers exhibit toughness and scrubability but poor water resistance. Vinyl acetate polymers tend to be much less expensive than the acrylic polymers Notwithstanding the advantages of VAE-based latex paints, it is well documented that several deficiencies exist for VAE emulsions in paint products versus solvent-based paints and acrylic-based latex paints. One such deficiency relates to wet adhesion. The term "wet adhesion" is used in the paint industry to describe the ability of a paint coating to retain its adhesive bond under wet conditions. Good wet adhesion is well known in solvent-based paints, but water-based paints tend to lose adhesion in wet or humid conditions. This inherent deficiency limits extensive use of latex paints in humid environments. For example, paints intended for exteriors are frequently exposed to moisture, due to rain and humidity, while the same harsh conditions are encountered in interior paints used in bathrooms and kitchens. Further, resistance to washing and abrasive scrubbing also is an important requirement for painted surfaces which become soiled and must be washed and cleaned.

Much effort has been devoted in the past to improving the wet adhesion capabilities of latex-based paints. This effort has involved attempts to optimize various paint formulation parameters, such as pigment types, dispersant types, surfactants and coalescing agents. The most significant improvement in wet adhesion properties has been observed through functional modification of the polymer backbone of the latex binder, to incorporate amine, amide and acetoacetate functionalities.

In particular, cyclic ureido derivatives have been described in the patent literature as imparting wet adhesion properties, and such components are described, for example, in U.S. Pat. Nos. 4,104,220; 4,111,877; 4,219,454; 4,319,032; and 4,599,417. However, cyclic ureido-containing functional monomers are very expensive and their inclusion results in a drastic and uneconomic increase in the cost of the vinyl acetate polymers. U.S. Pat. No. 3,935,151 describes another approach to improving the wet adhesion properties of vinyl acetate polymers by blending into a vinyl chloride/acrylic latex a copolymer which is a vinyl-acrylic, a vinyl chloride-acrylic or an all acrylic latex containing hydroxy methyl diacetone acrylamide (HMDAA).

Another deficiency of VAE-based latex paints in general versus solvent-based paints and acrylic-based latex paints relates to block resistance. Dry paint often comes into contact with itself especially in window and door areas and, depending on its hardness, the pressure, temperature, humidity, and duration of time which the surfaces are in contact, the painted surfaces sometimes stick together. This undesirable sticking together of two painted surfaces when pressed together or placed in contact with each other is referred to as "blocking". Thus, an important characteristic of coatings is block (or blocking) resistance.

One approach for improving block resistance of paint films based on VAE latex technology has been to blend into the VAE latex-based compositions a certain type of acrylic latex particles containing trialkoxylated silane functionalities as set forth in U.S. Pat. No. 6,174,960. This is deemed to be a relatively expensive route to enhanced blocking resistance performance due to the cost of the trialkoxylated silane monomer.

Notwithstanding the above-described prior art techniques for improving wet adhesion and block resistance of VAE emulsion-containing, aqueous latex paints, there continues to be a need to identify new coating formulations, especially in the form of paints, which employ VAE film-forming lattices and which also provide enhanced paint film wet adhesion and anti-blocking performance. It has been found that an improved VAE based coating composition, e.g., a latex paint, can be produced by blending into a VAE-based paint formulation an acrylic latex copolymer emulsion wherein the acrylate copolymer contains selected types and amounts of modifying co-monomers and is used with a selected type and amount of a specific cross-linking system.

SUMMARY

In one aspect, the present invention is directed to aqueous latex-based coating compositions which comprise a blend of an ethylene-vinyl acetate emulsion copolymer component and an acrylic emulsion copolymer component. The blend of these two emulsion copolymer types also contains a specific type of water-soluble cross-linking agent which can eventually react with the acrylic emulsion copolymer component.

The ethylene-vinyl acetate copolymer component comprises the emulsion polymerization product of from about 5 wt % to about 20 wt % of ethylene, from about 70 wt % to about 95 wt % of vinyl acetate, and from about 0 wt % to about 10 wt % of auxiliary co-monomers. This ethylene-vinyl acetate copolymer is present in the blend in an amount from about 50 wt % to about 95 wt %, based on total weight of ethylene-vinyl acetate and acrylic emulsion copolymers.

The acrylic copolymer comprises the emulsion polymerization product of from about 70 wt % to about 99 wt % of one or more $C_1$-$C_{12}$ esters of (meth)acrylic acid or one or more of these $C_1$-$C_{12}$ esters of (meth)acrylic acid in combination with one or more vinyl aromatic co-monomers. The acrylic copolymer also comprises from about 0.1 wt % to about 10 wt % of one or more carboxy-functional co-monomers selected from (meth)acrylic acids, crotonic acid, itaconic acid, and combinations of these carboxy-functional co-monomers, from about 0.1 wt % to about 10 wt % of one or more carbonyl functional co-monomers, and from about 0 wt % to about 10 wt % of one or more auxiliary co-monomers. This acrylic copolymer is present in the blend in an amount from about 5 wt % to about 50 wt % based on total weight of ethylene-vinyl acetate and acrylic emulsion copolymers.

The water-soluble cross-linking agent which is present in the blend is one which comprises at least two hydrazine moieties. This cross-linking agent is present in the blend in an amount such that the molar ratio of hydrazine groups to copolymer carbonyl groups in said blend is between about 0.1 and 2.0.

In another aspect, the present invention is directed to aqueous latex paint compositions which are based on the coating compositions hereinbefore described. Such paint compositions, in addition to the aqueous copolymer blend with its two copolymer components and the water-soluble cross-linking agent, also comprise a pigment component including inorganic solids selected from inorganic pigments, inorganic fillers and mixtures thereof present in an amount such that the paint formulation has a pigment volume concentration (PVC) of from about 25% to 85%. These paint compositions will also comprise one or more auxiliary components selected from wetting agents, dispersants, emulsifiers, protective colloids, thickeners, antifoams, dyes and preservatives.

DETAILED DESCRIPTION

The coating and paint compositions of the present invention comprise a blend which contains two types of aqueous emulsion copolymers which are curable to form a film or coating. As used herein, "emulsion" means a dispersion of particulate matter in an aqueous phase which contains an emulsifier or surfactant suitable for preparing the emulsion. The emulsion copolymers used to form the blends of the compositions herein can be prepared using free radical emulsion polymerization techniques which are known in the art. The two types of copolymers used to form the blend are of the ethylene-vinyl acetate type and the acrylic type.

The blend of ethylene-vinyl acetate and acrylic emulsion copolymers also contains a selected type of cross-linking agent which, upon removal of water from the aqueous blend, will react with the acrylic emulsion copolymer component of the blend. These copolymer and cross-linking agent components, along with a variety of optional components of the copolymers and compositions herein, as well as copolymer and composition preparation techniques and composition performance, are described in detail hereinafter as follows:
Ethylene-Vinyl Acetate (VAE) Copolymer One type of emulsion copolymer used in the blend of copolymers which forms the compositions herein comprises a copolymer of vinyl acetate and ethylene. Ethylene-vinyl acetate copolymers which can be abbreviated as "EVA" or "VAE" copolymers are well-known in the art.

The VAE copolymer is an aqueous emulsion polymerization product of ethylene, vinyl acetate, and optionally other unsaturated co-monomers which form an emulsion copolymer. The amount of ethylene monomer used to prepare the VAE copolymer is from about 5 wt % to about 20 wt %, preferably from about 10 wt % to about 15 wt %, based on the total weight of co-monomers used to prepare the VAE copolymer. The amount of vinyl acetate used to prepare the VAE copolymer is from about 70 wt % to about 95 wt %, preferably from about 75 wt % to about 90 wt %, based on the total weight of co-monomers used to prepare the VAE copolymer.

The VAE copolymer used in the blend of the compositions herein can also contain from 0 wt % to about 10 wt %, and more preferably from about 0.1 wt % to about 5 wt %, of one or more optional unsaturated co-monomers, based on the total weight of co-monomers used to prepare the VAE copolymer. Such optional co-monomers can include, for example, $C_1$-$C_{12}$ esters of (meth)acrylic acid such as are also used to form the acrylic copolymer component of the copolymer blend. Other types of optional co-monomers for the use in forming the VAE emulsion copolymer are described in greater detail hereinafter. Preferably, however, the VAE copolymer used in the blends which form the compositions herein should be substantially free of co-monomers which contain unesterified carboxyl moieties.

Acrylic Copolymer

The second copolymer component of the blend used to form the compositions herein comprises a selected type of acrylic emulsion copolymer. The major component of the acrylic copolymer will comprise one or more types, and preferably at least two types of $C_1$-$C_{12}$ esters of (meth)acrylic acid. The acrylic copolymer can also comprise one or more types of these $C_1$-$C_{12}$ esters of (meth)acrylic acid in combination with one or more types of vinyl aromatic co-monomers, such as styrene.

Preferred acrylate monomers for use as the major component of the acrylic emulsion copolymer can be selected from $C_1$-$C_{10}$ alkyl esters (meth)acrylic acids; and hydroxy $C_1$-$C_4$ alkyl esters of (meth)acrylic acids. More preferably, the acrylate monomers can be selected from the group consisting of $C_1$-$C_4$ alkyl esters of acrylic and methacrylic acid. Specific examples of acrylate monomers include methyl acrylate, ethyl acrylate, butyl acrylate, 2-ethyl hexyl acrylate, decyl acrylate, methyl methacrylate, butyl methacrylate, iso-butyl methacrylate, iso-bornyl methacrylate hydroxy ethyl acrylate, hydroxy ethyl methacrylate and combinations of these acrylate monomers. A preferred combination of these co-monomers comprises the combination of butyl acrylate and methyl methacrylate.

Combinations of the foregoing acrylate co-monomers with vinyl aromatic co-monomers can also be used as main co-monomers in the acrylic emulsion copolymer component. Suitable vinyl aromatic monomers include, for example, styrene, 1-vinyl napthalene, 2-vinyl napthalene, 3-methyl styrene, 4-propyl styrene, t-butyl styrene, and the like. The preferred vinyl aromatic co-monomer is styrene. The preferred combination of acrylate and vinyl aromatic co-monomers comprises the combination of butyl acrylate and styrene.

The main acrylate or vinyl aromatic/acrylate co-monomers of the acrylic emulsion copolymer will generally comprise from about 70 wt % to about 99 wt % of the acrylic emulsion copolymer based on the total co-monomers which make up this copolymer. Preferably the acrylate or vinyl aromatic/acrylate main co-monomers will comprise from about 90 wt % to about 98 wt % of the total co-monomers in the acrylic emulsion copolymer.

A second essential component of the acrylic emulsion copolymer of the blends used to form the compositions herein comprises a carboxy-functional co-monomer selected from (meth)acrylic acids, crotonic acid, itaconic acid, and combinations of these carboxy-functional co-monomers. Preferred carboxy-functional co-monomers are (meth)acrylic acid and itaconic acid. Itaconic acid is most preferred.

The carboxy-functional co-monomers of the acrylic emulsion copolymer will generally comprise from about 0.1 wt % to about 10 wt % of the acrylic emulsion copolymer based on the total co-monomers which make up this copolymer. Preferably the carboxy-functional co-monomers will comprise from about 0.5 wt % to about 5.0 wt % of the total co-monomers in the acrylic emulsion copolymer.

A third essential component of the acrylic emulsion copolymer of the blends used to form the compositions herein comprises one or more carbonyl functional co-monomers. Such carbonyl functional co-monomers are generally those which contain one or more aldehyde or keto groups and a polymerizable double bond.

Examples of suitable carbonyl group-containing co-monomers to be incorporated into the acrylic emulsion copolymer component include acrolein, diacetone acrylamide, formyl-styrene, vinyl alkyl ketones having 4 to 7 carbon atoms such as vinyl methyl ketone, vinyl ethyl ketone or vinyl butyl ketone, diacetone acrylate, acetonitrile acrylate, diacetone methacrylate, 2-hydroxypropyl acrylate acetyl acetate and butanediol-1,4-acrylate acetyl acetate. Among these carbonyl functional co-monomers, diacetone acrylamide, acrolein and vinyl methyl ketone are preferred. The most preferred carbonyl functional co-monomer is diacetone acrylamide (DAAM).

The carbonyl group-containing co-monomers of the acrylic emulsion copolymer will generally comprise from about 0.1 wt % to about 10 wt % of the acrylic emulsion copolymer based on the total co-monomers which make up this copolymer. Preferably the carbonyl-functional co-monomers will comprise from about 1 wt % to about 6 wt % of the total co-monomers in the acrylic emulsion copolymer.

The acrylic copolymer used in the blend of the compositions herein, like the VAE copolymer, can also contain from 0 wt % to about 10 wt %, and more preferably from about 0.1 wt % to about 5 wt %, of one or more optional unsaturated co-monomers, based on the total weight of co-monomers used to prepare the acrylic copolymer. Such optional co-monomers are described in greater detail hereinafter.

Optional Co-Monomers

Both the VAE emulsion copolymers and the acrylic emulsion copolymers used in the blends which form the compositions herein can contain a variety of optional co-monomers. Such optional co-monomers can be those which promote better film-forming or coating-forming performance by the compositions herein or can provide realization of films and coatings of desirable properties. Such desirable film/coating properties can include, for example, enhanced adhesion to surfaces or substrates, improved wet adhesion, better resistance to removal by scrubbing or other types of weathering or abrasion, and improved resistance to film or coating cracking.

The optional co-monomers useful for incorporation into the emulsion copolymers of the compositions herein are those which contain at least one polymerizable double bond along with one or more additional functional moieties. Such optional or auxiliary co-monomers can thus include unsaturated silane co-monomers, glycidyl co-monomers, ureido co-monomers and combinations of these auxiliary optional co-monomers.

Unsaturated silanes useful as optional co-monomers can generally correspond to a substituted silane of the structural Formula I:

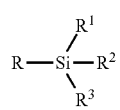

Formula I in which R denotes an organic radical olefinically unsaturated in the ω-position and $R^1$ $R^2$ and $R^3$ which may be identical or different, denote halogen, preferably chlorine, or the group —OZ, Z denoting hydrogen or primary or secondary alkyl or acyl radicals optionally substituted by alkoxy groups. Suitable unsaturated silane compounds of the Formula I are preferably those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols carrying the Si group of up to 6 carbon atoms. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinylmethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as optional auxiliary co-monomers in either the VAE or acrylic emulsion copolymer. Glycidyl compounds are epoxy-containing materials and can facilitate cross-linking of the emulsion copolymers in the copolymer blend. Examples of suitable glycidyl optional co-monomers include glycidyl acrylate, glycidyl methacrylate, allyl glycidyl ether, vinyl glycidyl ether, vinyltoluenes and styrenes substituted with a glycidyl radical in the aromatic moiety, and vinylbenzoates substituted with a glycidyl radical in the aromatic moiety Another type of optional co-monomer for use in either the VAE or acrylic emulsion copolymer components comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

Emulsion Copolymer Preparation

The VAE and acrylic copolymers comprising the essential and optional co-monomers hereinbefore described can be prepared using conventional emulsion polymerization procedures which result in the preparation of copolymer emulsions. These emulsions can then be incorporated into the coating compositions herein in aqueous latex form. Such procedures are described, for example, in U.S. Pat. No. 5,849,389, the disclosure of which is incorporated herein by reference in its entirety.

In a typical polymerization procedure, the vinyl ester, ethylene, acrylate esters and other co-monomers can be polymerized in an aqueous medium in a suitable polymerization vessel under pressures not exceeding 100 atmospheres in the presence of a catalyst component and at least one emulsifying agent. The aqueous reaction mixture in the polymerization vessel can be maintained by a suitable buffering agent at a pH of about 2 to 6.

The manner of combining the several polymerization ingredients, i.e., emulsifiers, co-monomers, catalyst system components, etc., can vary widely. Generally an aqueous medium containing at least some of the emulsifier(s) can be initially formed in the polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

The catalyst system components can also be added to the polymerization vessel continuously, incrementally in stages, or as a single charge addition. Suitable polymerization catalysts include the water-soluble free-radical-formers (initiators) generally used in emulsion polymerization, such as hydrogen peroxide, sodium persulfate, potassium persulfate and ammonium persulfate, as well as tert-butyl hydroperoxide, in amounts of between 0.01% and 3% by weight, preferably 0.01% and 1% by weight, based on the total amount of the emulsion. These materials can be used together with reducing agents such as sodium formaldehyde-sulfoxylate, ferrous salts, sodium dithionite, sodium hydrogen sulfite, sodium sulfite, sodium thiosulfate, as redox catalysts in amounts of 0.01% to 3% by weight, preferably 0.01% to 1% by weight, based on the total amount of the emulsion. The free-radical-formers can be added to the aqueous emulsifier solution initially present in the polymerization vessel or can be added during the polymerization in staged doses. When redox systems are to be formed in the polymerization vessels, the initiator should be added separately, e.g., in separate solutions, from the reducing agent(s).

As noted, the entire amount of the aqueous medium with the polymerization additives can be present in the polymerization vessel before introduction of the co-monomers. Or alternatively, the aqueous medium, or a portion of it, can be added continuously or incrementally during the course of the polymerization. The timing and pattern of addition of co-monomers and catalysts, along with polymerization conditions, can be adjusted in conventional manner if desired so as to prepare heterogeneous copolymers, e.g., an acrylic copolymer, having two or more distinct glass transition temperatures, $T_g$.

In a typical polymerization procedure, the polymerization reactor can be filled with an aqueous emulsifier solution. Then at least a part of the co-monomers to be polymerized are added. After this initial reaction mixture is homogenized via agitation, polymerization can be started by adding at least a part of the catalyst system in order to prepare in situ seed material. Thereafter incremental or continuous addition of the remaining co-monomers and catalyst system components can be carried out to complete the preparation of the emulsion polymer. Alternatively, instead of preparation of in situ seed material, an aqueous medium containing a seed dispersion may be separately prepared and added to the polymerization vessel, again followed by addition of the remaining co-monomers and catalyst material.

The emulsion polymerization used to prepare the copolymers in aqueous latex form is carried out in the presence of a stabilization system which comprises one or more anionic and/or nonionic surfactants as emulsifiers. Such emulsifiers are conventional and well known. Suitable nonionic surfactants which can be used as emulsifiers in the emulsion stabilizing system of the copolymer and coating compositions herein include polyoxyethylene condensates. A wide variety of nonionic surfactants of this type are disclosed in the hereinbefore-referenced U.S. Pat. No. 5,849,389.

Even though polyoxyethylene condensates can be used as nonionic emulsifiers in the preparation of the copolymer emulsions and coating compositions herein, the emulsions and compositions herein are preferably substantially free of alkyl phenol ethoxylates (APE) such as octyl phenol ethoxylates. These represent a class of compounds typically used as surfactants that degrade to phenols. Such compounds are of environmental concern due to their estrogen mimicking characteristics.

Suitable anionic surfactants which can be used as emulsifiers in the emulsion stabilizing system of the emulsion copolymer and coating compositions herein include alkyl aryl sulfonates, alkali metal alkyl sulfates, sulfonated alkyl esters and fatty acid soaps. A wide variety of anionic surfactants of this type are also disclosed in the hereinbefore-referenced U.S. Pat. No. 5,849,389.

Conventionally, various protective colloids such as polyvinyl alcohol (PVOH) and other conventional protective colloid-forming materials have also been used to stabilize emulsion polymer latex compositions of the types hereinbefore described, instead of or in addition to the surfactant emulsifiers. In one embodiment, the emulsions and compositions herein can contain up to about 5 wt % of protective colloid stabilizing agents, based on the total amount of copolymers in the emulsions or compositions being stabilized.

In another embodiment, the emulsions and compositions herein can be substantially free of such protective colloids as stabilizing agents. Such emulsions are considered to be "substantially free" of protective colloids if protective colloids comprise no more than 0.5 wt % of the emulsions and compositions, based on the total amount of copolymers in the emulsions or compositions being stabilized. The latex emulsions and compositions herein which utilize emulsifier, i.e., surfactant, stabilizing agents and are substantially free of protective colloids are characterized herein as being "substantially all-surfactant-based" emulsions and compositions.

VAE/Acrylic Copolymer Blend

The VAE and acrylic copolymer emulsions are, of course, prepared separately prior to being combined into the copolymer blends used to form the coating compositions herein. The VAE copolymer emulsions are, in fact, conventional components of coating and paint formulations and are commercially available materials. Such VAE copolymer emulsions having the components described herein may be obtained, for example, from Celanese™ Emulsion Polymers under the designation EcoVAE® Series or by simply requesting high scrub VAE resins, or by requesting suitable VAE resins using like terminology.

The VAE and acrylic copolymer emulsions may be combined, i.e., premixed, into the copolymer blend prior to being incorporated into the coating compositions herein. Alternatively, these two types of copolymer emulsions may be combined into a "blend" formed in situ by adding them separately to the coating, e.g., paint, compositions which are being formulated to contain this blend. It is even possible to form the VAE/acrylic "blend" by combining two or more different coating, e.g., paint, compositions into which the VAE and acrylic emulsions had previously been added individually.

Whether premixed or combined into coating compositions separately, the blend formed by the combination of the VAE and acrylic copolymer emulsions will generally comprise from about 50 wt % to about 95 wt % of the VAE component and from about 5 wt % to about 50 wt % of the acrylic component, based on total weight of ethylene-vinyl acetate and acrylic emulsion copolymer solids forming the blend. More preferably, the VAE copolymer component of the blend will generally comprise from about 70 wt % to about 90 wt %, based on total weight of ethylene-vinyl acetate and acrylic emulsion copolymer solids used in the blend and the acrylic component of the blend will generally comprise from about 10 wt % to about 30 wt %, based on total weight of ethylene-vinyl acetate and acrylic emulsion copolymer solids used in the blend.

Water-Soluble Cross-Linking Agent

In addition to the two types of emulsion copolymers described herein, the blend of these copolymer types must also contain a selected type of water-soluble cross-linking agent. Such a cross-linking agent will react with the carbonyl functionalities of the acrylic emulsion copolymer as water is removed from the coating compositions herein and as a film or coating is formed from the copolymer components.

The selected type of water-soluble cross-linking agent used in the compositions herein comprises a compound which contains at least two hydrazine moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is the most preferred water-soluble cross-linking agent for use in the compositions herein.

The hydrazine group-containing cross-linking agent may be added to the copolymer blend or to the composition containing the copolymer blend, either separately by itself or in combination with one or both of the copolymer emulsions or in combination with any other coating composition component(s). Generally, the hydrazine cross-linking agent will be added to and form part of the acrylic emulsion copolymer. It is with the acrylic emulsion copolymer that this cross-linking agent will eventually react.

The water-soluble cross-linking agent will generally be present in the copolymer blend in an amount such that the molar ratio of cross-linking agent hydrazine groups to copolymer carbonyl groups in the blend is between about 0.1 and 2.0. More preferably the molar ratio of cross-linking agent hydrazine groups to copolymer carbonyl groups in the blend will be between about 0.5 and 1.5.

Coating/Paint Composition Formulation and Preparation

The coating compositions herein are prepared from the blend of emulsion copolymers which form an aqueous, i.e., water-based, latex. The term "latex" is used herein in its conventional sense, meaning, i.e., a dispersion of particulate matter in an aqueous phase which contains an emulsifier or surfactant suitable for preparing and stabilizing the latex. The latex coating compositions herein comprise a certain copolymer blend dispersed in an aqueous phase with an appropriate emulsifier system.

The essential components of the coating compositions herein are most commonly combined with other components which are conventionally used to form paint compositions. Paints can be formulated using techniques known to those skilled in the art of manufacturing paint. Generally, water, defoamer, pigment, filler (also known as extender pigment) and surfactant stabilizer (in addition to emulsifiers used during emulsion polymerization of the copolymer blend) are combined to form a grind, where the pigments and fillers are ground to a desired particle size as indicated by a Hegman reading of 2 to 6.

The "Hegman" reading is the most common way a grind dispersion (as opposed to a polymer dispersion) is characterized. Hegman numbers relate to the fineness of the grind dispersion measured in microns. A higher Hegman number means finer grind. A Hegman number of about 2 to about 3 is almost exclusive to a flat paint. Satin and Eggshell paints can have Hegman numbers in the range of about 3 to about 6 depending upon formulation, preferably in the range of 3 to less than 5. A Hegman number of about 6 represents a lower semi-gloss range. Additional water, the latex copolymer blend, rheology modifiers, biocides and the like are then added to the grind, and the entire batch is blended and adjusted to desired Hegman readings and viscosity, thereby forming the paint composition.

Preferred fillers useful in the paint compositions herein can be, for example, calcium carbonate, magnesite, dolomite, kaolin, mica, talc, silica, calcium sulfate, feldspar, barium sulfate and opaque polymer. Examples of white pigments useful in the paint compositions herein can be zinc oxide, zinc sulfide, basic lead carbonate, antimony trioxide, lithopone (zinc sulfide+barium sulfate) and, preferably, titanium dioxide. Examples of inorganic colored pigments which may preferably be used in the paint compositions herein include iron oxides, carbon black, graphite, luminescent pigments, zinc yellow, zinc green, Paris blue, ultramarine, manganese black, antimony black, manganese violet or Schweinfurt green. Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/kaolin and calcium carbonate/kaolin/talc have also been found to be particularly useful in practice. To increase the hiding power of the coating and to save on titanium dioxide, finely divided fillers such as, for example, finely divided calcium carbonate and mixtures of various calcium carbonates with different particle size distribution are frequently used. Calcined clays are commonly used to increase film dry opacity as they help incorporate air voids into the dry film. Air voids create a big difference in refractive index in the film and scatter light, yielding more opacity in the film once cured. To adjust the hiding power, the shade and the depth of color of the coatings formed, the fillers are mixed with appropriate amounts of white pigment and inorganic and/or organic colored pigments.

To disperse the fillers and pigments in water, 0.1 to 0.6% by weight, based on the total weight of the aqueous preparation, of auxiliaries based on anionic or nonionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

The paint compositions herein will preferably have a pigment volume concentration (PVC) ranging from about 25% to about 85%. PVC represents the volume of pigment plus fillers in the paint composition divided by the volume of pigment, fillers and film-forming copolymers times 100%. PVC is described in greater detail in U.S. Patent Publication No. 2010/0056696 which is incorporated herein by reference.

Thickeners may also be added to the paint formulations herein. Thickeners which may be used include, inter alia, preferably cellulose derivates such as methylcellulose (MC), hydroxyethylcellulose (HEC) and carboxymethyl-cellulose. Other thickeners which may be used include casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available. Inorganic thickeners, such as, for example, bentonites or hectorite, may also be used. Such thickeners are generally employed in amounts of from about 0.1% to 3% by weight, preferably from about 0.1% to 1% by weight, based on the total weight of the aqueous latex paint formulations.

For various applications, it is sometimes also desirable to include small amounts of other additives, such as bactericides, pH modifiers, and antifoamers, incorporated in the latex paint compositions herein. This may be done in a conventional manner and at any convenient point in the preparation of the latexes.

Commercially available latex paints may contain other components which serve to raise the Volatile Organic Content of the paint formulation. Volatile Organic Content of a paint formulation refers to the presence of volatile organic components; i.e., any volatile component that contains carbon and is not listed by the EPA as an exempt solvent. VOC sources may include co-solvents, including glycols, which help with wet edge application, open time, and freeze-thaw resistance, and coalescents, which help the latex polymer form a film by lowering $T_g$ as the film dries; emulsion components and most additives at low levels. For instance, amino methyl propanol is a volatile compound used to adjust pH.

Volatile Organic Content in terms of grams per liter is calculated according to the formula set forth in the hereinbefore-mentioned U.S. Patent Publication No. 2010/0056696 which is incorporated herein by reference. Commercially available latex paints may have VOC levels higher than 150 g/L. In contrast, the coating and paint compositions described herein can have a very low volatile organic content (VOC), such as less than about 50 g/L, or even less than 5 g/L.

The VAE and acrylic emulsion copolymers used as the film-forming component in the compositions herein may already be present during the dispersion of the pigment and filler. But in most cases, the copolymer blend is advantageously added to the filler/pigment paste which is still hot or also cooled, under rapid or also slower stirring.

One feature that affects the overall combination of properties in a latex paint formulation is the particle size range present in the emulsion. When the proportion of large particles is high, scrub resistance of coatings formed from the resulting paint is reduced. When the proportion of fines, i.e., those particles having a size less than 0.1 micron, is high, the paint will have poor flow and leveling characteristics. The particle size of latex in the copolymer emulsion can be affected by adjusting the level of protective colloid or surfactant concentration added initially or incrementally during polymerization. Agitation is another variable which can affect particle size in the copolymer emulsion. These factors may be adjusted as necessary by methods known in the art.

Coating/Paint Composition Performance

Upon curing, the copolymers in the aqueous latex coating/paint compositions herein form a film or coating which will adhere to a substrate onto which the coating/paint composition has been applied. The film or coating seals and protects the substrate.

The minimum temperature required for the copolymers in the latex to form a coating or film is referred to as the Minimum Film-Forming Temperature or MFT. MFT is related to the glass transition temperature, $T_g$, of the emulsion copolymers in the copolymer blend, but can also be affected by other components of such coating/paint compositions such as coalescents. The coating/paint compositions herein will preferably have a MFT of equal to or less than about 10° C.

The coating/paint compositions herein will form films or coatings which exhibit excellent adhesion onto dry substrates or hard surfaces to which such compositions have been applied. The films/coatings so formed will also exhibit excellent wet adhesion characteristics. Wet adhesion refers to the ability of coating from a latex paint to adhere to a substrate under wet conditions. Wet adhesion is a critical property not only for exterior paints, but also for some interior applications, such as in kitchens and bathrooms.

Wet Adhesion and Dry Adhesion performance of the coating/paint compositions herein can be quantified by means of testing in accordance with the modified procedure of ASTM Test No. D 3359 as described hereinafter in the Test Methods section. The coating/paint compositions herein will preferably form coatings/films which exhibit a rating of at least about 3 when tested in this manner.

As noted above, another important performance property of coatings/films formed from latex coating/paint products relates to blocking resistance. Blocking refers to the relative tackiness of a dry coating. It is desirable that two dry, coated surfaces when placed in contact do not block or stick together.

The coating/paint compositions herein, with their selected type of VAE and acrylic copolymer blend along with the selected type of cross-linking system, exhibit excellent resistance to blocking. Such compositions will, in fact, preferably exhibit a Blocking Resistance rating of at least about 5 for room temperature testing, and of at least about 3 for elevated temperature conditions, when tested in accordance with the modified version of ASTM Test No. D 4946-89 described hereinafter in the Test Methods section.

Addition of fluorocarbon surfactants can also serve to improve block resistance even further by modifying surface properties. A fluorocarbon surfactant acts as a surface-active agent that blooms to the top of a film (the air interface) as it dries or cures and acts as a release layer that interferes with the intermingling of resin layers of two films in contact with one another.

Fluorocarbon surfactant additives of this class may be obtained from DuPont™ under the designation Capstone™ or Zonyl®, or 3M™ under the designation Novec™, for example. See "DuPont™ Zonyl® Fluoroadditives as Antiblock Agents, A Comparative Study", Product Literature, January 2003. See also, United States Patent Application 2008/0145552 to Berrettini et al. which provides examples of suitable fluoroadditives. Fluorochemical additives may optionally be added to the coating/paint compositions herein in an amount of from about 0.05 weight % up to about 10 weight %. See also U.S. Pat. No. 7,041,727 to Kubicek et al.

EXAMPLES

Preparation and performance of the aqueous latex-based coating compositions herein are described further by means of the examples which follow. In these examples, several different types of "acrylic" copolymer emulsions are prepared. These acrylic emulsions are then, in some instances, combined with two different types of "VAE" copolymer emulsions, one VAE copolymer containing a small amount of a wet adhesion-enhancing co-monomer, the other VAE copolymer without this wet adhesion-promoting co-monomer. The VAE emulsions, one of the acrylic emulsions, and the several combinations of VAE and acrylic emulsions are then formulated into semi-gloss paint compositions. These paint compositions are then evaluated for their blocking resistance performance and coating adhesion characteristics.

In the first five examples, various types of acrylic emulsions are prepared. These are designated as Acrylic Emulsions A1, A2, A3, A4 and A5 (Comparative).

Example 1

Preparation of Acrylic Emulsion A1
(Itaconic Acid Co-Monomer—One Pre-Emulsion)

Two separate feeds, designated as Feed 1 and Feed 2, are prepared having the compositions in grams as set forth in Table 1.

TABLE 1

|  | Feed 1 | Feed 2 |
| --- | --- | --- |
| water | 56 | 370 |
| $C_{12/14}$-alkyl ethoxylate sulfate (30%, Na-salt, 4EO average) | — | 63.9 |
| $C_{12/14}$-alkyl ethoxylate (65%, 30 EO average) | — | 4.48 |
| methyl methacrylate | — | 450 |
| butyl acrylate | — | 616 |
| itaconic acid | — | 17.9 |
| diacetone acrylamide (DAAM) | — | 36.0 |
| ammonia (25%) | — | 7.53 |
| ammonium persulfate | 6.20 | — |

A 3-LT reactor, fitted with a condenser, a mechanical stirrer and a thermometer is filled with 661 g of water, 13.6 g of $C_{12/14}$-alkyl ethoxylate sulfate (30%, Na-salt, 4EO average) and 0.57 g of $C_{12/14}$-alkyl ethoxylate (65%, 30 EO average). The reactor contents are heated to 70° C. under stirring, and a mixture of 50.4 g of methyl methacrylate and 69.6 g of butyl acrylate is added, followed by a solution of 1.33 g of ammonium persulfate in 17 g of water. Reactor temperature is allowed to peak.

Twenty minutes after the initial addition of the first ammonium persulfate solution to the reactor, Feed 1 and Feed 2 additions to the reactor are commenced over 300 minutes. During the feeds, reactor temperature is controlled at 70° C.

After completion of the feeds, the reactor contents are held at 70° C. for another 15 minutes, then a solution of 0.47 g of sodium formaldehyde sulfoxylate in 18 g of water is added followed by a solution of 0.62 g of t-butyl hydrogen peroxide (70%) in 15 g of water. After 15 minutes, the reactor contents are cooled below 40° C. Then 180 g of adipic acid dihydrazide (ADH) solution (10%) are added to the reactor over 10 minutes, followed by addition of an ammonia solution to adjust pH and a biocide solution.

A polymer dispersion with a solids content of 47.6% and a pH of 8.5 is obtained as Acrylic Emulsion A1.

Example 2

Preparation of Acrylic Emulsion A2
(Itaconic Acid Co-Monomer—Two Pre-Emulsions)

Three separate feeds, designated as Feed 1, Feed 2 and Feed 3, are prepared having the compositions in grams as set forth in Table 2.

TABLE 2

|  | Feed 1 | Feed 2 | Feed 3 |
| --- | --- | --- | --- |
| water | 56 | 259 | 111 |
| $C_{12/14}$-alkyl polyglycolether sulphate (30%, sodium salt, 4 EO average) | — | 44.7 | 19.2 |
| $C_{12/14}$-alkyl ethoxylate (65%, 30 EO average) | — | 3.14 | 1.34 |
| methyl methacrylate | — | 126 | 414 |
| butyl acrylate | — | 368 | 158 |
| itaconic acid | — | 12.5 | 5.38 |
| diacetone acrylamide (DAAM) | — | 25.2 | 10.8 |
| ammonia (25%) | — | 5.27 | 2.26 |
| ammonium persulfate | 6.20 | — | — |

A 3-LT reactor, fitted with a condenser, a mechanical stirrer and a thermometer is filled with 661 g of water, 13.6 g of $C_{12/14}$-alkyl polyglycolether sulfate (30%, sodium salt, 4 EO average) and 0.57 g of $C_{12/14}$-alkyl ethoxylate (65%, 30 EO average). The reactor contents are heated to 70° C. under stirring, and a mixture of 57.1 g of methyl methacrylate and 63.0 g of butyl acrylate is added, followed by a solution of 1.33 g of ammonium persulfate in 17 g of water. Reactor temperature is allowed to peak.

Twenty minutes after the initial addition of the first ammonium persulfate solution to the reactor, Feed 1 and Feed 2 additions to the reactor are commenced over 300 minutes and 135 minutes respectively Immediately after completion of Feed 2 addition, Feed 3 addition is started over 150 minutes. During the feeds, reactor temperature is controlled at 70° C.

After completion of the feeds, the reactor contents are held at 70° C. for another 15 minutes, then a solution of 0.47 g of sodium formaldehyde sulfoxylate in 18 g of water is added, followed by a solution of 0.62 g of t-butyl hydrogen peroxide (70%) in 15 g of water. After 15 minutes, the reactor contents are cooled below 40° C. Then 180 g of adipic acid dihydrazide (ADH) solution (10%) are added to the reactor over 10 minutes, followed by addition of an ammonia solution to adjust pH and a biocide solution.

A polymer dispersion with a solids content of 47.4% and a pH of 8.8 is obtained as Acrylic Emulsion A2.

Example 3

Preparation of Acrylic Emulsion A3
(Acrylic Acid Co-Monomer)

Three separate feeds, designated as Feed 1, Feed 2 and Feed 3, are prepared having the compositions in grams as set forth in Table 3.

TABLE 3

|  | Feed 1 | Feed 2 | Feed 3 |
| --- | --- | --- | --- |
| water | 56 | 259 | 111 |
| $C_{12/14}$-alkyl polyglycolether sulfate (30%, sodium salt, 4 EO average) | — | 44 | 19.2 |
| $C_{12/14}$-alkyl ethoxylate (65%, 30 EO average). | — | 3.14 | 1.34 |
| methyl methacrylate | — | 126 | 414 |
| butyl acrylate | — | 368 | 158 |
| acrylic acid | — | 13.9 | 5.94 |
| diacetone acrylamide (DAAM) | — | 25.2 | 10.8 |
| ammonia (25%) | — | 4.70 | 2.02 |
| ammonium persulfate | 6.20 | — | — |

The preparation of an acrylic emulsion is carried out as described in Example 2 using instead of the Table 2 feeds, the three feeds described in Table 3 above. A polymer dispersion with a solids content of 47.5% and a pH of 8.4 is obtained as Acrylic Emulsion A3.

Example 4

Preparation of Acrylic Emulsion A4
(Methacrylic Acid Co-Monomer)

Three separate feeds, designated as Feed 1, Feed 2 and Feed 3, are prepared having the compositions in grams as set forth in Table 4.

TABLE 4

|  | Feed 1 | Feed 2 | Feed 3 |
|---|---|---|---|
| Water | 56 | 259 | 111 |
| $C_{12/14}$-alkyl polyglycolether sulfate (30%, sodium salt, 4 EO average) | — | 44.7 | 19.2 |
| $C_{12/14}$-alkyl ethoxylate (65%, 30 EO average). | — | 3.14 | 1.34 |
| methyl methacrylate | — | 126 | 414 |
| butyl acrylate | — | 368 | 158 |
| methacrylic acid | — | 16.6 | 7.13 |
| diacetone acrylamide (DAAM) | — | 25.2 | 10.8 |
| ammonia (25%) | — | 1.27 | 0.55 |
| ammonium persulfate | 6.20 | — | — |

The preparation of an acrylic emulsion is carried out as described in Example 2 using instead of the Table 2 feeds, the three feeds described in Table 4 above. A polymer dispersion with a solids content of 47.6% and a pH of 8.4 is obtained as acrylic Emulsion A4.

Example 5

Preparation of Acrylic Emulsion A5 (Comparative)
(Ureido Functional Acid Co-Monomer/No DAAM or ADH)

Three separate feeds, designated as Feed 1, Feed 2 and Feed 3, are prepared having the compositions in grams as set forth in Table 5.

TABLE 5

|  | Feed 1 | Feed 2 | Feed 3 |
|---|---|---|---|
| water | 56 | 259 | 111 |
| $C_{12/14}$-alkyl ethoxylate sulfate (30%, Na-salt, 4EO average) | — | 44.7 | 19.2 |
| $C_{12/14}$-alkyl ethoxylate (65%, 30 EO average). | — | 3.14 | 1.34 |
| methyl methacrylate | — | 126 | 414 |
| butyl acrylate | — | 368 | 158 |
| itaconic acid | — | 12.5 | 5.38 |
| *Norsocryl 104 | — | 20.0 | 8.59 |
| ammonia (25%) | — | 5.27 | 2.26 |
| ammonium persulfate | 6.20 | — | — |

*Norsocryl 104: 2-(2-oxoimidazolidin-1-yl) ethylmethacrylate/methyl methacrylate mixture available from Arkema The preparation of an acrylic emulsion is carried out as described in Example 2 using instead of the Table 2 feeds, the three feeds described in Table 5 above. Further, the addition of the adipic acid dihydrazide as is done in Examples 1-4 is omitted in this Example 5. A polymer dispersion with a solids content of 49.6% and a pH of 8.9 is obtained as Acrylic Emulsion A5 (Comparative).

Example 6

VAE Emulsion Copolymers—VAE1 and VAE2

Two different conventional vinyl acetate/ethylene (VAE) emulsion copolymers are prepared using conventional preparation procedures. Each VAE copolymer contains 91.2 wt % vinyl acetate and 8.8 wt % ethylene, based on the total of the vinyl acetate and ethylene co-monomers in the copolymers. Both VAE1 and VAE2 are prepared using a stabilization package of alkyl benzene sulfonate and ethoxylated alcohol emulsifiers and a sodium persulfate/Bruggolite® FF6 redox polymerization catalyst system. Both VAE1 and VAE2 contain 0.5 part per hundred parts of total monomers of an anionic polymerizable emulsifier as a co-monomer. Both VAE1 and VAE2 are in the form of emulsion copolymer dispersions having a solids content of about 55%.

The VAE1 copolymer contains no additional co-monomers. The VAE2 copolymer contains 1 part per hundred parts of total monomers of a wet adhesion-promoting monomer (WAM). The WAM co-monomer incorporated into the VAE2 copolymer is a cylic urea/ureido-functional material.

Example 7

Semi-Gloss Latex Paint Formulation

The VAE and acrylic emulsion copolymers described above, either as single emulsion types and/or in various combinations, are incorporated as film/coating-formers into a semi-gloss paint formulation as shown in this Example 7. The ingredients of the paint formulation, as well as the mixing procedure used to prepare the paint, are set forth in Table 6.

TABLE 6

| Interior Semi-Gloss Paint | |
|---|---|
| Ingredient | Amount (Gallons) |
| Water | 29.96 |
| Propylene Glycol | 0.58 |
| Natrosol ® Plus 330 | 0.17 |
| AMP-95 | 0.57 |
| Acticide ® BW-20 | 0.12 |
| FoamStar ® A-38 Defoamer | 0.31 |
| Tamol ™ 1124 Dispersant | 0.31 |
| Carbowet ® 106 | 0.25 |
| Mix, Then add | |
| Kronos 2310 | 7.58 |
| Burgess #28 | 2.30 |
| Camel-Wite ® | 1.11 |
| Disperse to 6.5 Hegman, Then add | |
| Water | 7.92 |
| VAE1 Emulsion Copolymer* | 45.69* |
| Texanol ® | 0.63 |
| Polyphobe ® TR-116 | 0.55 |
| Polyphobe ® TR-117 | 1.65 |
| FoamStar ® A-38 Defoamer | 0.31 |
| TOTAL | 100.00 |

*Table 7 shows formulation with the VAE1 emulsion copolymer. When VAE1 is replaced with other emulsion copolymers including the acrylic emulsion alone or the VAE/acrylic blends, such substitutions are made on a constant volume solids basis. Therefore, certain adjustments have to be made because the VAE and acrylic emulsions have different solids % and different densities. Adjustments for solids/density differences among in the various copolymer emulsions used to make these paint compositions are made by adding or removing water.

In Table 6, the several commercially available ingredients are described as follows:

Natrosol® Plus 330 is a hydroxyethyl cellulose thickener, available from Aqualon™, a business unit of Hercules™.
AMP-95™ is a 2-amino-2-methyl-1-propanol pH adjuster/buffer, available from Angus Chemical Company.
Acticide® BW-20 is an aqueous-based benzisothiazolinone preservative, available from Thor Specialties, Inc.
FoamStar™ A-38 is a dispersible modified defoamer, available from Cognis-Polymers, Coatings and Inks.
Tamol® 1124 is a dispersant, available from Rohm and Haas™ Company.

Carbowet® 106 is an alcohol ethoxylate surfactant, available from Air Products™ Additives.
Kronos™ 2310 is a titanium dioxide pigment, available from Kronos™.
Burgess #28 is a pigment, available from Burgess Pigments.
Camel-Wite® is a calcium carbonate filler, available from Imerys™/CR World Minerals.
Texanol® ester alcohol is a coalescent, available from Eastman™ Coatings Film Technologies.
Polyphobe® TR-116 and TR-117 are thickeners, available from UCAR Emulsion Systems.

The semi-gloss paint formulations according to Table 6 have the following physical characteristics:

| | |
|---|---|
| Density (Pounds/Gallon) | 10.97 |
| % Non-Volatiles by Volume | 36.62 |
| % Non-Volatiles by Mass | 51.81 |
| % Pigment Volume Concentration (PVC) | 31.81 |
| Volatile Organic Content (g/L) | <50 |

Test Methods

Several semi-gloss paint formulations according to Example 7/Table 6 with various emulsion copolymer components are evaluated for the blocking resistance and adhesion characteristics which paint coatings provided by such formulations exhibit. In making such evaluations, the following Test Methods are used.

Blocking Resistance Test

Blocking resistance, or the propensity of a coating to adhere to itself instead of to its substrate, is measured according to a modified version of ASTM D4946. On a sealed white Leneta™ WK card, one 6"-wide draw down coating of each sample of about 3 mils thickness is prepared and allowed to cure for about 1 week at room temperature (e.g., from about 20-25° C.) and 50% humidity. After curing, the draw down coating sample is cut into 1.5" squares.

Two of these squares are oriented face to face (i.e., coated sides touching) and are placed under a 1000 gram weight in a 120° F. oven for about 30 min. Another set of two of these squares are oriented face to face and placed under a 1000-gram weight at room temperature for about 18 hours. Both sets of face to face squares are then allowed to equilibrate to ambient temperature for about ½ hour. Each set of squares is then pulled apart using a slow and steady force, forming a T pattern. More than one set of squares are typically used so that an average rating can be obtained.

Blocking resistance is rated on a scale of 1 to 10, with 1 representing more than 75% blocking and above 5 representing no delamination of film. A perfect score of 10 would indicate that there was no tackiness between the squares and they basically fall apart with no force applied.

Dry and Wet Adhesion Test

Dry and Wet Adhesion is measured using test conditions specified under a version of ASTM D3359. Various 3-mil thick draw down coatings of paint compositions are applied to alkyd primed plastic panels and let dry for 7 days. After drying, wet and dry adhesion of the paint coatings are evaluated using Permacel P-99 (now replaced with Intertape LA 26 tape) and a 6×6 cross-hatch adhesion standard test, as detailed in ASTM D3359 Method B.

For wet adhesion, the coated panels are covered with a paper towel which is folded over 4 times into a square which is placed over the cross-hatch section. The paper towel is saturated with water and allowed to sit for 30 minutes. After 30 minutes the paper towel is removed, and the section is blotted dry with a dry paper towel. The section is then allowed to sit for 5 minutes.

Both dry and wet sections are rated for adhesion after contact with and removal of the tape. The adhesion ratings range from 0 through 5, based on the relative percent area of flaking/peeling within the 6×6 cross-hatch area. For these ratings, 5=no flaking; 4=less than 5% flaking; 3=5-15% flaking; 2=15-35% flaking; 1=35-65% flaking; and 0=more than 65% flaking.

Examples 8-15

Semi-Gloss Latex Paint Formulations

Blocking Resistance and Adhesion Performance

The paint formulations of Example 7 as set forth in Table 6 are evaluated for the blocking resistance and adhesion characteristics which their paint coatings provide. Such evaluations are made in accordance with the procedures set forth in the Test Methods section.

For each of these examples, the following emulsion copolymer components from Examples 1-6 as set forth above are used: Ratios are based on the amount of volume solids in each emulsion type.

Example 8—VAE1/A1 @ 65/35 Ratio
Example 9—VAE2/A2 @ 65/35 Ratio
Example 10—VAE2/A3 @ 65/35 Ratio
Example 11—VAE2/A4 @ 65/35 Ratio
Example 12—VAE2/A5(Comparative) @ 65/35 Ratio
Example 13—VAE1 @ 100%
Example 14—VAE2 @ 100%
Example 15—A2 @ 100%

Results of the blocking resistance and dry and wet adhesion testing are set forth in Table 7.

TABLE 7

| Example No. | 8 | 9 | 10 | 11 | 12 | 13 | 14 | 15 |
|---|---|---|---|---|---|---|---|---|
| VAE | VAE1 - (No WAM) | VAE2 (WAM) | VAE2 (WAM) | VAE2 (WAM) | VAE2 (WAM) | VAE1 (No WAM) | VAE2 (WAM) | — |
| Acryic | A1 DAAM/ADH + Itaconic Acid | A2 DAAM/ADH + Itaconic Acid | A3 DAAM/ADH + Acrylic Acid | A4 DAAM/ADH + Methacrylic Acid | A5 (ureido + Itaconic Acid) No DAAM/ADH | — | — | A2 |
| Ratio VAE/Acrylic Copolymer | 65/35 | 65/35 | 65/35 | 65/35 | 65/35 | 100/0 | 100/0 | 0/100 |
| Block Resistance @ R/T | 6 | 7 | 6.6 | 7.3 | 5.6 | 5 | 1 | 10 |
| Block Resistance @ 50° C. | 5 | 3 | 1 | 1.6 | 0 | 0 | 0 | 4.6 |
| Adhesion - Wet | 3 | 5 | 4 | 5 | 5 | 2 | 2 | 4 |
| Adhesion - Dry | 0 | 4 | 4 | 4 | 4 | 0 | 1 | 4 |

What is claimed is:

1. An aqueous latex-based coating composition, said composition comprising a blend of an ethylene-vinyl acetate emulsion copolymer and an acrylic emulsion copolymer wherein:
   (a) the ethylene-vinyl acetate emulsion copolymer comprises an emulsion polymerization product of: from about 5 wt % to about 20 wt % of ethylene, from about 70 wt % to about 95 wt % of vinyl acetate, and from about 0 wt % to about 10 wt % of one or more auxiliary co-monomers; said ethylene-vinyl acetate emulsion copolymer being present in the blend in an amount from about 50 wt % to about 95 wt %, based on total weight of ethylene-vinyl acetate and acrylic emulsion copolymers; and
   (b) the acrylic emulsion copolymer comprises an emulsion polymerization product of: from about 70 wt % to about 99 wt % of one or more $C_1$-$C_{12}$ esters of (meth)acrylic acid or one or more of said $C_1$-$C_{12}$ esters of (meth)acrylic acid in combination with one or more vinyl aromatic co-monomers, from about 0.1 wt % to about 10 wt % of one or more carboxy-functional co-monomers selected from (meth)acrylic acids, crotonic acid, itaconic acid, and combinations of these carboxy-functional co-monomers, from about 0.1 wt % to about 10 wt % of one or more carbonyl functional co-monomers, and from about 0 wt % to about 10 wt % of one or more auxiliary co-monomers; said acrylic emulsion copolymer being present in the blend in an amount from about 5 wt % to about 50 wt % based on total weight of ethylene-vinyl acetate and acrylic emulsion copolymers, and
   (c) the blend further comprises a water-soluble cross-linking agent comprising at least two hydrazine moieties, said water-soluble cross-linking agent being present in said blend in an amount such that the molar ratio of hydrazine groups to carbonyl groups of the acrylic emulsion copolymer in said blend is between about 0.1 and 2.0.

2. The composition according to claim 1 wherein the one or more $C_1$-$C_{12}$ esters of (meth)acrylic acid or the one or more $C_1$-$C_{12}$ esters of (meth)acrylic acid in combination with one or more vinyl aromatic co-monomers of the acrylic emulsion copolymer comprises $C_1$-$C_{12}$ esters of (meth)acrylic acid selected from methyl acrylate, ethyl acrylate, butyl acrylate, 2-ethyl hexyl acrylate, decyl acrylate, methyl methacrylate, butyl methacrylate, iso-butyl methacrylate, iso-bornyl methacrylate, hydroxy ethyl acrylate, hydroxy ethyl methacrylate and combinations thereof.

3. The composition according to claim 2 wherein the one or more $C_1$-$C_{12}$ esters of (meth)acrylic acid or the one or more $C_1$-$C_{12}$ esters of (meth)acrylic acid in combination with one or more vinyl aromatic co-monomers of the acrylic emulsion copolymer comprises a combination of methyl methacrylate and butyl acrylate or a combination of styrene and butyl acrylate.

4. The composition according to claim 1 wherein the one or more carboxyl-functional (meth)acrylic co-monomers of the acrylic emulsion copolymer is selected from itaconic acid, a combination of itaconic acid and acrylic acid, and a combination of itaconic acid and methacrylic acid.

5. The composition according to claim 1 wherein the one or more carbonyl functional co-monomers of the acrylic emulsion copolymer is selected from keto-containing co-monomers, aldehyde-containing co-monomers, and combinations thereof.

6. The composition according to claim 5 wherein the one or more carbonyl functional co-monomers of the acrylic emulsion copolymer is selected from diacetone acrylamide, diacetone acrylamide, acrolein, and vinyl methyl ketone.

7. The composition according to claim 6 wherein the one or more carbonyl functional co-monomers of the acrylic emulsion copolymer is diacetone acrylamide.

8. The composition according to claim 1 wherein the water-soluble cross-linking agent component of the blend is selected from dicarboxylic acid dihydrazides having from about 2 to 10 carbon atoms and aliphatic dihydrazines having from about 2 to 4 carbon atoms.

9. The composition according to claim 8 wherein the water-soluble cross-linking agent component of the blend is adipic acid dihydrazide.

10. The composition according to claim 1 wherein at least one of the ethylene-vinyl acetate emulsion copolymer and the acrylic emulsion copolymer are produced with said one or more auxiliary co-monomers, which are selected from unsaturated silane co-monomers, glycidyl co-monomers, cyclic ureido co-monomers and combinations of these auxiliary co-monomers.

11. The composition according to claim 10 wherein the one or more auxiliary co-monomers are selected from vinyl trialkoxysilane monomers, glycidyl acrylate, glycidyl methacrylate, allyl glycidyl ether, vinyl glycidyl ether, vinyltoluenes, styrenes substituted with a glycidyl radical in the aromatic moiety, vinylbenzoates substituted with a glycidyl radical in the aromatic moiety, and combinations of these auxiliary co-monomers.

12. The composition according to claim 10 wherein the one or more auxiliary co-monomers comprise a cyclic uriedo co-monomer, which imparts improved wet adhesion properties.

13. The composition according to claim 1 wherein the blend has a Minimum Film-Forming Temperature (MFT) of equal to or less than about 10° C.

14. The composition according to claim 1 wherein the blend has a Minimum Film-Forming Temperature (MFT) of equal to or less than about 5° C.

15. The composition of clam 1 wherein the acrylic emulsion copolymer comprises a heterogeneous copolymer having two or more distinct glass transition temperatures, Tg.

16. The composition according to claim 1 which provides films that exhibit a Wet Adhesion and Dry Adhesion rating of at least about 3 when tested in accordance with a modified procedure of ASTM Test No. D 3359.

17. The composition according to claim 1 which provides films that exhibit a Blocking Resistance rating of at least about 5 for room temperature conditions, and of at least about 3 for elevated temperature conditions, when tested in accordance with a modified procedure of ASTM Test No. D 4946-89.

18. A paint composition comprising an aqueous latex-based coating composition according to claim 1, wherein said paint composition further comprises:
   (i) a pigment component including inorganic solids selected from inorganic pigments, inorganic fillers and mixtures thereof present in an amount such that the paint formulation has a pigment volume concentration (PVC) of from about 25% to 85%; and
   (ii) one or more auxiliary components selected from wetting agents, dispersants, emulsifiers, protective colloids, thickeners, antifoams, dyes and preservatives.

19. An aqueous latex-based coating composition, said composition comprising a blend of an ethylene-vinyl acetate emulsion copolymer and an acrylic emulsion copolymer wherein:
  (a) the ethylene-vinyl acetate emulsion copolymer comprises an emulsion polymerization product of: from about 5 wt % to about 20 wt % of ethylene, from about 70 wt % to about 95 wt % of vinyl acetate, and from about 0 wt % to about 10 wt % of one or more auxiliary co-monomers; said ethylene-vinyl acetate emulsion copolymer being present in the blend in an amount from about 70 wt % to about 90 wt %, based on total weight of ethylene-vinyl acetate and acrylic emulsion copolymers; and
  (b) the acrylic emulsion copolymer comprises an emulsion polymerization product of: from about 70 wt % to about 99 wt % of one or more $C_1$-$C_{12}$ esters of (meth)acrylic acid, from about 0.1 wt % to about 10 wt % of one or more carboxyl functional co-monomers selected from itaconic acid, acrylic acid and methacrylic acid, from about 0.1 wt % to about 10 wt % of diacetone acrylamide, and from about 0 wt % to about 10 wt % of one or more auxiliary co-monomers; said acrylic emulsion copolymer being present in the blend in an amount from about 10 wt % to about 30 wt % based on total weight of ethylene-vinyl acetate and acrylic emulsion copolymers, and
  (c) the blend further comprises adipic acid dihydrazide as a water-soluble cross-linking agent in an amount such that the molar ratio of hydrazine groups to carbonyl groups of the acrylic emulsion copolymer in said blend is between about 0.1 and 2.0.

20. A paint composition comprising an aqueous latex-based coating composition according to claim 19, wherein said paint composition further comprises:
  (i) a pigment component including inorganic solids selected from inorganic pigments, inorganic fillers and mixtures thereof present in an amount such that the paint formulation has a pigment volume concentration (PVC) of from about 25% to 85%; and
  (ii) one or more auxiliary components selected from wetting agents, dispersants, emulsifiers, protective colloids, thickeners, antifoams, dyes and preservatives.

\* \* \* \* \*